US009588966B2

(12) United States Patent
Eck

(10) Patent No.: US 9,588,966 B2
(45) Date of Patent: Mar. 7, 2017

(54) DATA SORTING FOR LANGUAGE PROCESSING SUCH AS POS TAGGING

(71) Applicant: Facebook, Inc., Menlo Park, CA (US)

(72) Inventor: Matthias Gerhard Eck, Mountian View, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 14/804,802

(22) Filed: Jul. 21, 2015

(65) Prior Publication Data
US 2017/0024376 A1 Jan. 26, 2017

(51) Int. Cl.
G06F 17/27 (2006.01)
G06F 17/28 (2006.01)
G06F 17/20 (2006.01)
G06N 5/02 (2006.01)

(52) U.S. Cl.
CPC ............. *G06F 17/28* (2013.01); *G06N 5/022* (2013.01)

(58) Field of Classification Search
None
See application file for complete search history.

(56) References Cited

U.S. PATENT DOCUMENTS

| 8,321,357 | B2* | 11/2012 | Lapir | G06F 17/27 706/12 |
| 8,577,670 | B2* | 11/2013 | Wang | G06F 17/2715 704/255 |
| 8,682,647 | B1* | 3/2014 | Lee | G06F 17/2775 704/1 |
| 9,092,425 | B2* | 7/2015 | Mirowski | G06F 17/28 |
| 9,367,526 | B1* | 6/2016 | Vozila | G06Q 10/107 |
| 2008/0288252 | A1* | 11/2008 | Cerra | G10L 15/30 704/244 |
| 2008/0312934 | A1* | 12/2008 | Cerra | G10L 15/30 704/275 |
| 2009/0030691 | A1* | 1/2009 | Cerra | G10L 15/30 704/255 |
| 2014/0149108 | A1* | 5/2014 | Wang | G06F 17/2715 704/9 |
| 2015/0100537 | A1* | 4/2015 | Grieves | G06N 5/048 706/52 |

(Continued)

OTHER PUBLICATIONS

Eck, M. et al., "Low Cost Portability for Statistical Machine Translation based on N-gram Frequency and TF-IDF," IWSLT, pp. 61-67, 2005.

(Continued)

*Primary Examiner* — Satwant Singh
(74) *Attorney, Agent, or Firm* — Perkins Coie LLP

(57) ABSTRACT

Technology is disclosed that improves language coverage by selecting sentences to be used as training data for a language processing engine. The technology accomplishes the selection of a number of sentences by obtaining a group of sentences, computing a score for each sentence, sorting the sentences based on their scores, and selecting a number of sentences with the highest scores. The scores can be computed by dividing a sum of frequency values of unseen words (or n-grams) in the sentence by a length of the sentence. The frequency values can be based on posts in one or more particular domains, such as the public domain, the private domain, or other specialized domains.

20 Claims, 5 Drawing Sheets

(56) References Cited

U.S. PATENT DOCUMENTS

2016/0140643 A1* 5/2016 Nice .................. G06Q 30/0631
                                                      705/26.7
2016/0188567 A1* 6/2016 Pasternack ............. G06N 7/005
                                                        704/9
2016/0217127 A1* 7/2016 Segal .................. G06F 17/2775
2016/0217128 A1* 7/2016 Baum ................. G06F 17/2775

OTHER PUBLICATIONS

Eck, Matthias, "Developing Deployable Spoken Language Translation Systems given Limited Resources," dissertation on-line, Universität Fridericiana zu Karlsruhe, 184 pages, Nov. 7, 2008, http://digbib.ubka.uni-karlsruhe.de/volltexte/1000010682 [Accessed on Apr. 2, 2015].

* cited by examiner

DATA SORTING FOR LANGUAGE PROCESSING SUCH AS POS TAGGING

BACKGROUND

The Internet has made it possible for people to connect and share information globally in ways previously undreamt of. Social media platforms, for example, enable people on opposite sides of the world to collaborate on ideas, discuss current events, or just share what they had for lunch. As communications become ever more digitized, computerized language processing such as machine translations, part-of-speech (POS) tagging, and language corrections have become widespread.

Some methods of language processing use trained engines, such as POS tagging engines, machine translation engines, and correction engines. Trained engines can be created using training data. POS tagging engines can be trained using sentences. phrases, or n-grams (collectively herein "snippets") with associated POS tags. Machine translation engines can be trained using natural language snippet pairs that include identical or similar content in two or more languages. Correction engines can be trained using natural language snippet pairs that include a first language snippet and a subsequent language snippet that is a correction of the first language snippet.

Obtaining training data for an engine can be difficult and expensive. In some cases, training data is obtained by human or machine preparation of correct outputs for corresponding inputs. The engine can then be trained using the prepared training data to learn to produce similar results. However, the number of available items which can be used to create training data often far exceed an amount for which creating correct outputs is feasible. In one case, for example, potential input to a POS tagging engine can be any post to a social media website. One popular social media site receives over 250 million posts per day; thus manually tagging even 1% of the billions of possible inputs is not feasible.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Figure 1:
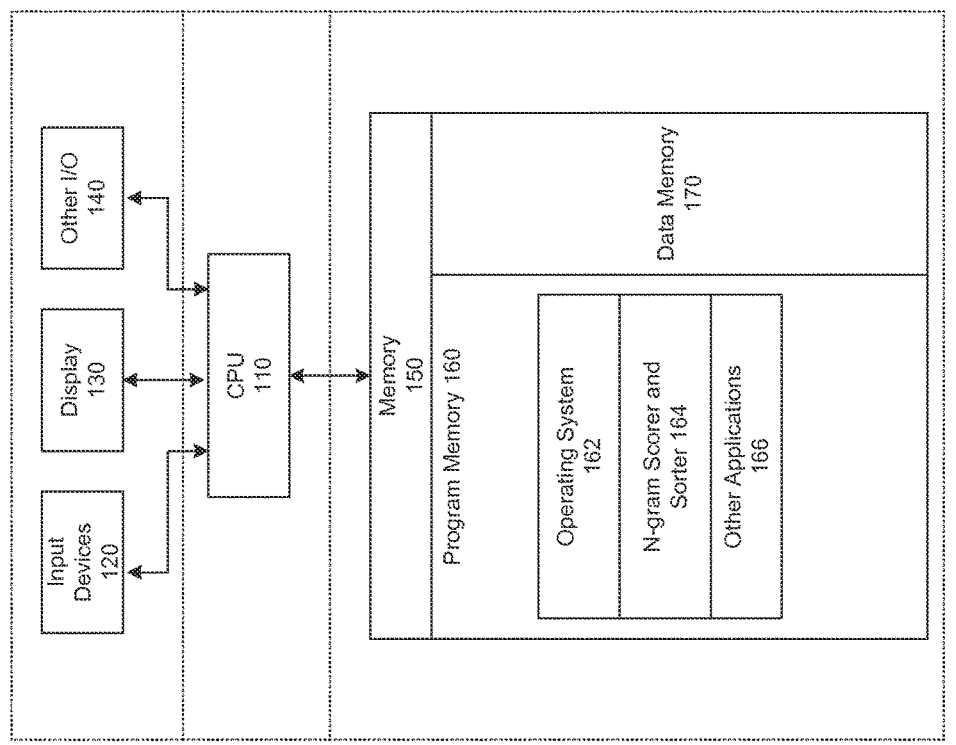
FIG. 1 is a block diagram illustrating an overview of devices on which some implementations of the disclosed technology can operate.

A data mining system is disclosed that can identify engine training data with high coverage of a language. "Coverage," as used herein, refers to a percentage of included words of a language. The data mining system can identify training data for engines that perform natural language processing on received language snippets, such as POS tagging, spelling corrections, grammar corrections, machine translations, etc. As used herein, a "language snippet" or "snippet" is a digital representation of one or more words or groups of characters from a natural language, and can be individual words, parts of sentences, whole sentences, multiple sentences or paragraphs, or larger texts. In some implementations, language snippets can be obtained from social network content items, such as posts. The data mining system can improve language coverage of selected snippets by sorting a set of potential snippets according to an n-gram score. The data mining system can compute the n-gram score for each potential snippet by comparing the frequency of n-grams in a snippet that have not previously been included in training data with the total length (e.g. number of words) of the snippet. In some implementations, the n-gram score can be the sum of the frequency values for n-grams in a snippet that have not previously been included in training data divided by the total length of the snippet.

The data mining system can sort potential snippets based on their n-gram score. A number of the potential snippets can be selected based on them being in a top percentage or number of the sorted snippets. In some implementations, snippets can be selected based on the selected snippets having a score above a threshold value, which can be accomplished without requiring the snippets to be sorted. In various implementations, selecting additional snippets can be independent of the total number of snippets selected or reaching a total number of snippets selected can be a stopping condition when a threshold is reached.

For example, a social media site could identify 2 million posts to their website as potential snippets that could be used as training data for a POS tagging engine. The cost for obtaining correct POS tagging results for a single post could be 5 ¢ per word in the post. Thus, if the average post length is 7 words, it would cost $700 k to obtain POS tagging results for all 2 million posts. The social media site may only want to spend $15 k on training data for a POS tagging engine, and thus must select 43 k of the 2 million posts to have tagged with POS data. More accurate trained engines can be obtained if the training data is varied, e.g. if the training data includes a variety of words from a source language. Accordingly, the social media site would want to select 43 k posts that provide good language coverage. The data mining system can achieve this by assigning an n-gram score to each of the 2 million posts and selecting the 43 k posts with the highest n-gram scores. Each n-gram score can be calculated by comparing the n-grams from each post that have a length below a threshold value, such as two words, to a "seen-list." The n-gram score for each potential snippet can be computed as the sum of the frequency values for each n-gram that is not in the seen-list divided by the word count of that potential snippet. A "seen-list," as used herein, is a data structure that records the n-grams that have been seen in analyzing previous snippets from the potential snippet set. As each n-gram from the potential snippet set is compared to the seen-list, if it is not on the seen-list it can be added to it.

Several implementations of the described technology are discussed below in more detail in reference to the figures. Turning now to the figures, FIG. 1 is a block diagram illustrating an overview of devices 100 on which some implementations of the disclosed technology may operate. The devices can comprise hardware components of a device 100 that can identify training data with improved language coverage. Device 100 can include one or more input devices 120 that provide input to the CPU (processor) 110, notifying it of actions. The actions are typically mediated by a hardware controller that interprets the signals received from the input device and communicates the information to the CPU 110 using a communication protocol. Input devices 120 include, for example, a mouse, a keyboard, a touchscreen, an infrared sensor, a touchpad, a wearable input device, a camera- or image-based input device, a microphone, or other user input devices.

CPU 110 can be a single processing unit or multiple processing units in a device or distributed across multiple devices. CPU 110 can be coupled to other hardware devices, for example, with the use of a bus, such as a PCI bus or SCSI bus. The CPU 110 can communicate with a hardware controller for devices, such as for a display 130. Display 130 can be used to display text and graphics. In some examples, display 130 provides graphical and textual visual feedback to a user. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected display (such as a heads-up display device or a head-mounted device), and so on. Other I/O devices 140 can also be coupled to the processor, such as a network card, video card, audio card, USB, firewire or other external device, camera, printer, speakers, CD-ROM drive, DVD drive, disk drive, or Blu-Ray device.

In some implementations, the device 100 also includes a communication device capable of communicating wirelessly or wire-based with a network node. The communication device can communicate with another device or a server through a network using, for example, TCP/IP protocols. Device 100 can utilize the communication device to distribute operations across multiple network devices.

The CPU 110 has access to a memory 150. A memory includes one or more of various hardware devices for volatile and non-volatile storage, and can include both read-only and writable memory. For example, a memory can comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory is not a propagating signal divorced from underlying hardware; a memory is thus non-transitory. Memory 150 includes program memory 160 that stores programs and software, such as an operating system 162, n-gram scorer and sorter 164, and any other application programs 166. Memory 150 also includes data memory 170 that can include, for example, language snippets, n-gram frequency data; snippet scores, sorting metadata, threshold values, POS engines or POS engine training data, translation engines or translation engine training data, correction engines or correction engine training data, configuration data, settings, and user options or preferences which can be provided to the program memory 160 or any element of the device 100.

The disclosed technology is operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, wearable electronics, tablet devices, multiprocessor systems, microprocessor-based systems, set-top boxes, programmable consumer electronics, network PCs, minicomputers, mainframe computers, distributed computing environments that include any of the above systems or devices, and the like.

Figure 2:
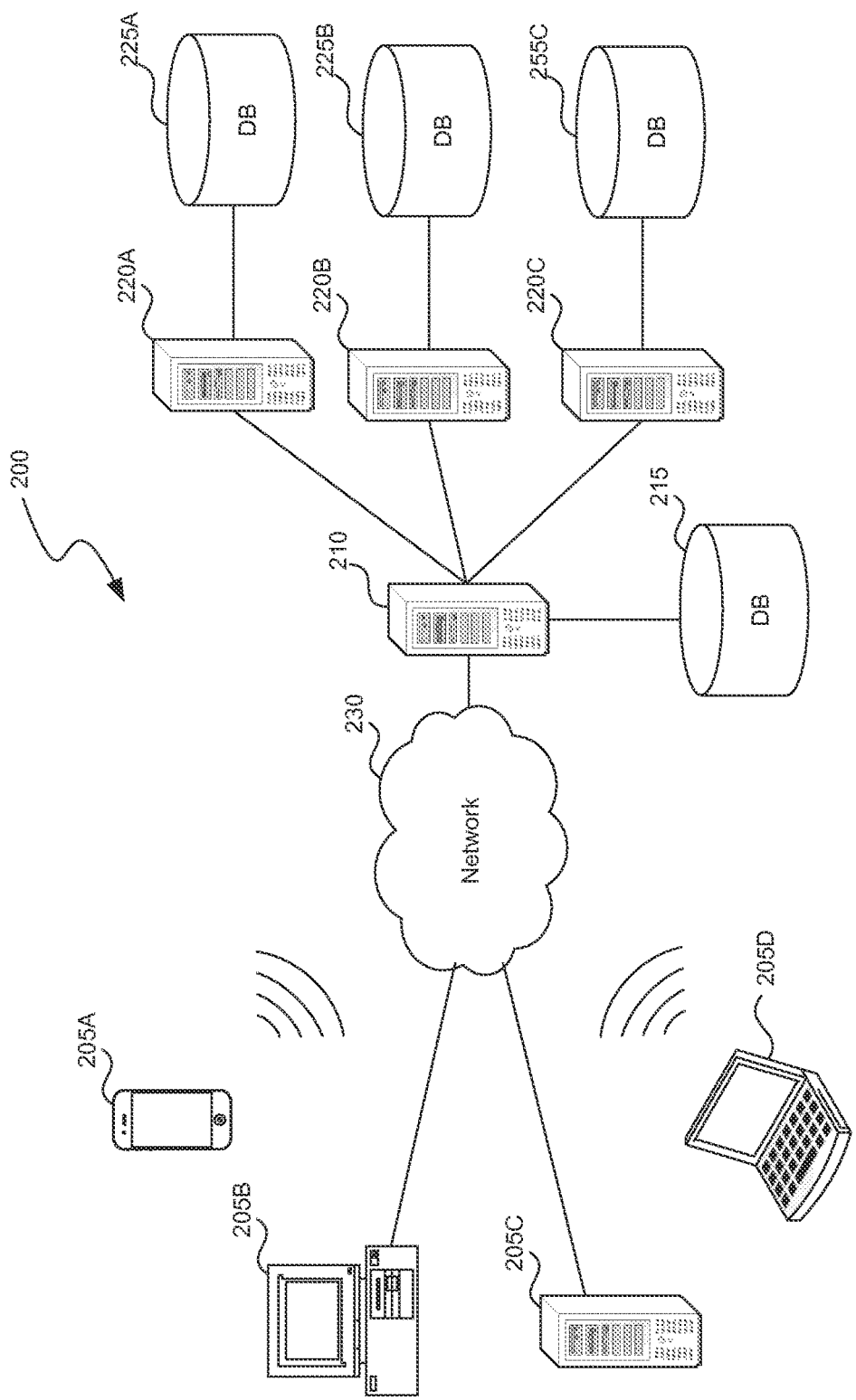
FIG. 2 is a block diagram illustrating an overview of an environment in which some implementations of the disclosed technology can operate.

FIG. 2 is a block diagram illustrating an overview of an environment 200 in which some implementations of the disclosed technology may operate. Environment 200 can include one or more client computing devices 205A-D, examples of which may include device 100. Client computing devices 205 can operate in a networked environment using logical connections 210 through network 230 to one or more remote computers such as a server computing device.

In some implementations, server 210 can be an edge server which receives client requests and coordinates fulfillment of those requests through other servers, such as servers 220A-C. Server computing devices 210 and 220 can comprise computing systems, such as device 100. Though each server computing device 210 and 220 is displayed logically as a single server, server computing devices can each be a distributed computing environment encompassing multiple computing devices located at the same or at geographically disparate physical locations. In some implementations, each server 220 corresponds to a group of servers.

Client computing devices 205 and server computing devices 210 and 220 can each act as a server or client to other server/client devices. Server 210 can connect to a database 215. Servers 220A-C can each connect to a corresponding database 225A-C. As discussed above, each server 220 may correspond to a group of servers, and each of these servers can share a database or can have their own database. Databases 215 and 225 can warehouse (e.g. store) information such as, language snippets, n-gram frequency data; snippet scores, POS engines or POS engine training data, translation engines or translation engine training data, correction engines or correction engine training data, etc. Though databases 215 and 225 are displayed logically as single units, databases 215 and 225 can each be a distributed computing environment encompassing multiple computing devices, can be located within their corresponding server, or can be located at the same or at geographically disparate physical locations.

Network 230 can be a local area network (LAN) or a wide area network (WAN), but can also be other wired or wireless networks. Network 230 may be the Internet or some other public or private network. The client computing devices 205 can be connected to network 230 through a network interface, such as by wired or wireless communication. While the connections between server 210 and servers 220 are shown as separate connections, these connections can be any kind of local, wide area, wired, or wireless network, including network 230 or a separate public or private network.

Figure 3:
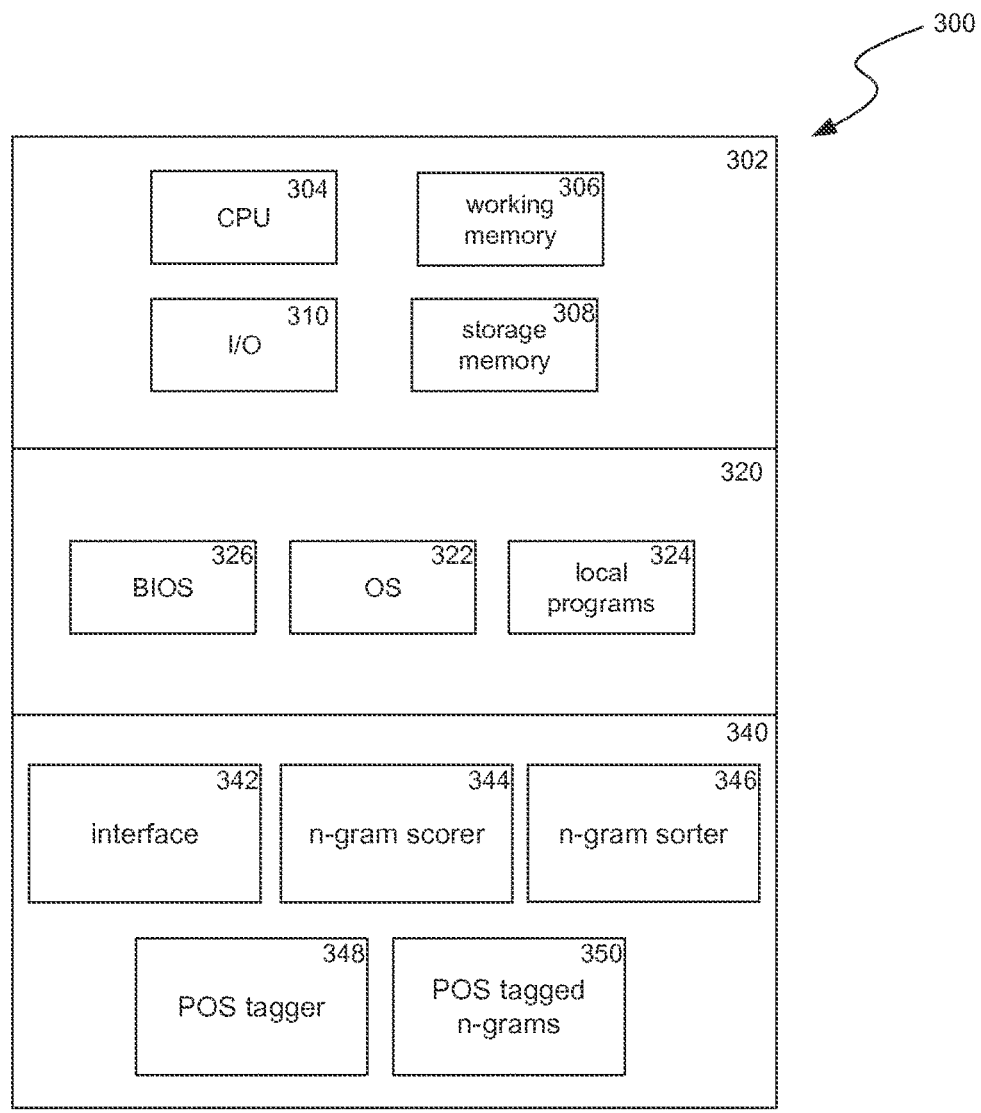
FIG. 3 is a block diagram illustrating components which, in some implementations, can be used in a system employing the disclosed technology.

FIG. 3 is a block diagram illustrating components 300 which, in some implementations, can be used in a system implementing the disclosed technology. The components 300 include hardware 302, general software 320, and specialized components 340. As discussed above, a system implementing the disclosed technology can use various hardware including central processing units 304, working memory 306, storage memory 308, and input and output devices 310. Components 300 can be implemented in a client computing device such as client computing devices 205 or on a server computing device, such as server computing device 210 or 220.

General software 320 can include various applications including an operating system 322, local programs 324, and a BIOS 326. Specialized components 340 can be subcomponents of a general software application 320, such as local programs 324. Specialized components 340 can include n-gram scorer 344, n-gram sorter 346, POS tagger 348, POS tagged n-grams 350, and components which can be used for controlling and receiving data from the specialized components, such as interface 342.

N-gram scorer 344 can receive a set of one or more snippets, such as through interface 342, and compute a score for each snippet. N-gram scorer 344 can compute a score for a selected snippet by first determining which n-grams in the selected snippet have not been seen when computing scores for previous snippets in the received snippet set, referred to herein as "unseen n-grams." In some implementations, seen n-grams can be stored in a data structure which can be updated to include each n-gram when that n-gram is not found in the data structure. N-gram scorer 344 can then determine a frequency for each of the unseen n-grams. In some implementations, the frequency can be determined based on a known language corpus. In some implementations, frequencies can be based on frequencies within a particular domain for which an engine is to be created, such as social media posts related to a particular subject or posts by authors with a particular characteristic. N-gram scorer 344 can then compute a score for the snippet by computing a sum of all the frequencies of the unseen n-grams and dividing that sum by a length (e.g. word count) of the snippet.

Once n-gram scorer 344 computes two or more scores for the received set of snippets, n-gram sorter 346 can sort the received snippets based on their scores. In various implementations, the sorting can occur as additional scores are computed or once all the received snippets have received a score.

POS tagger 348 can receive a set number of the snippets that, based on the sorting, have the top scores. POS tagger 348 can then perform POS tagging on these snippets. In some implementations, this POS tagging can be performed by an automated POS tagging system. In some implementations, this POS tagging can be performed by an automated POS tagging system with human oversight. In some implementations, POS tagger 348 can obtain POS tagging by providing the top scoring snippets for human POS tagging. The resulting POS tagged n-grams can be stored as POS tagged n-grams 350.

Those skilled in the art will appreciate that the components illustrated in FIGS. 1-3 described above, and in each of the flow diagrams discussed below, may be altered in a variety of ways. For example, the order of the logic may be rearranged, substeps may be performed in parallel, illustrated logic may be omitted, other logic may be included, etc.

Figure 4:
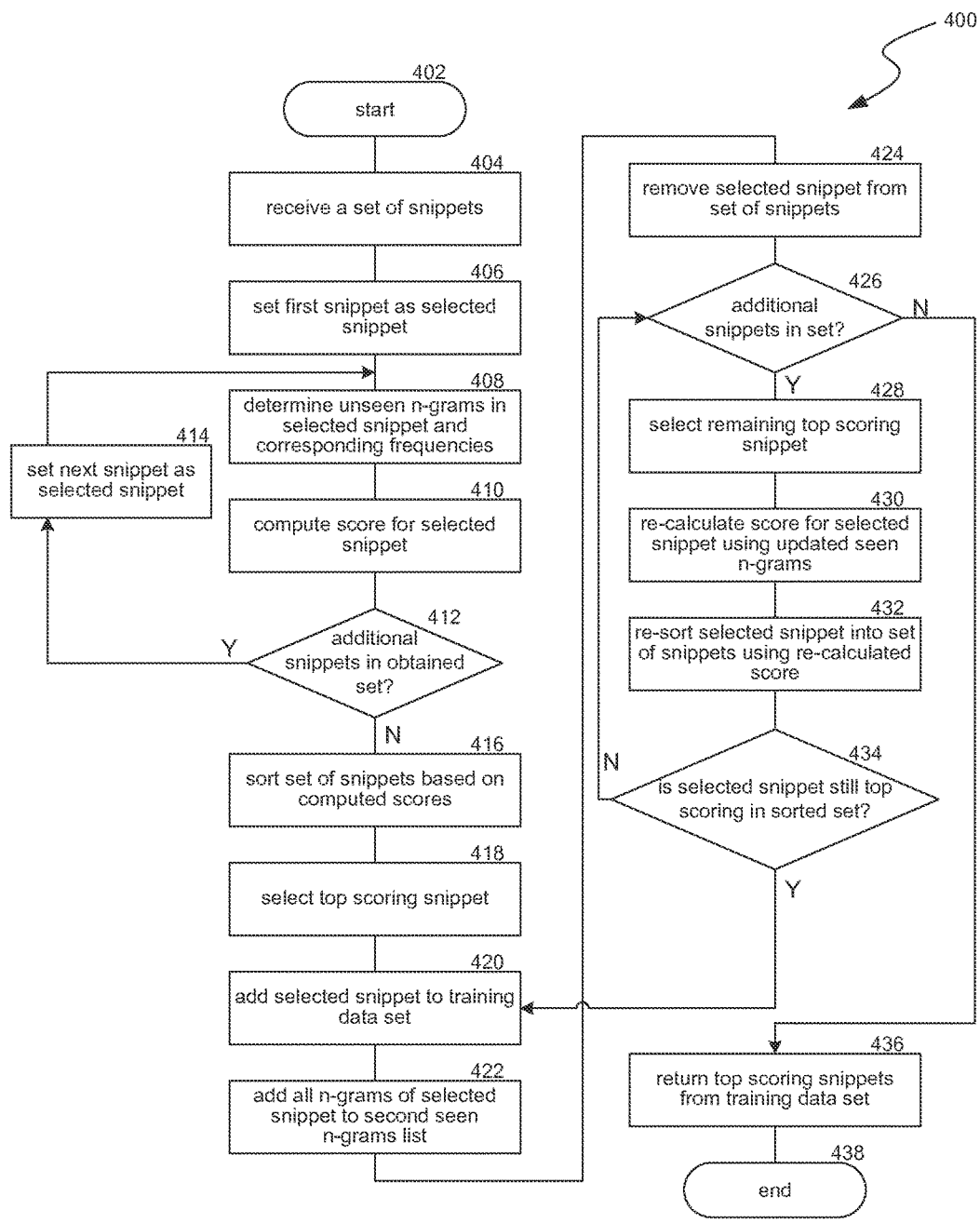
FIG. 4 is a flow diagram illustrating a process used in some implementations for obtaining high-coverage engine training data.

FIG. 4 is a flow diagram illustrating a process 400 used in some implementations for obtaining high-coverage engine training data. Process 400 begins at block 402 and continues to block 404. At block 404, process 400 can receive a set of snippets, a subset of which can be selected as training data for an engine. In some implementations, snippets can originate from posts or other messages provided to a social media website. In some implementations, snippets can be limited to a number of characters, words, or sentences. In some implementations, this limitation can be a filter for possible snippets or can be a parameter for dividing snippet sources into multiple possible snippets. At block 406, process 400 can set a first of the received snippets as a selected snippet.

At block 408, process 400 identifies whether any of the n-grams in the selected snippet are unseen n-grams. In some implementations, the n-grams are limited to a maximum number of words, such as 2, 3, or 4 words. Process 400 can determine whether each n-gram is an unseen n-gram by comparing that n-gram to a first list of seen n-grams. If the n-gram is not on the first list of seen n-grams, it can be identified as an unseen n-gram and can be added to the first list of seen n-grams. Process 400 can then determine a frequency value for each unseen n-gram and a sum of those frequency values. Frequency values can be determined using an analysis of n-grams compared to a total number of n-grams in a language corpus. In various implementations, frequency values can be determined from a corpus of social media posts, public available social media posts, news sources, specified webpages such as wiki pages, literary sources, etc. In some implementations, the frequency values can be based on a language corpus comprising the received snippets. Frequency values can be used as part of the scoring algorithm because n-grams that are more common should receive a higher score, i.e. should be more likely to be included in training data.

At block 410, process 410 can compute a score for the selected snippet. In some implementations, the score can be computed as the sum of the unaligned word frequency values divided by the length of the selected snippet. At block 412, process 400 determines if there are additional snippets in the set of snippets received at block 404 that have not been analyzed in the loop between blocks 408-414. If there are additional snippets, process 400 continues to block 414 where the next snippet in the set made the selected snippet to be analyzed in the loop between blocks 408-414. If there are no additional snippets, process 400 continues to block 416.

At block 416, process 400 can sort the received set of snippets based on the score assigned to each snippet by the loop between blocks 408-414. At block 418, the top scoring snippet can be selected. At block 420, the selected snippet can be added to a set of training data. At block 422, the selected snippet and all n-grams that are a subset of the selected snippet can be added to a second seen n-gram list. At block 424, the selected snippet can be removed from the set of snippets.

At block 426, if there are additional snippets in the set of snippets, process 400 can continue to block 428. In some implementations, instead of determining whether there are additional snippets in the set of snippets, process 400 at block 426 can determine whether a threshold level of snippets have been added to the training data set. For example, if process 400 is configured to select 500 snippets, process 400 continues to block 436 from block 426 when 500 snippets have been added to the training data set. At block 428, the snippet in the set that has the highest score once the snippet was removed at block 424 is set as the selected snippet. At block 430, the score for the selected snippet can be re-calculated using the second seen n-gram list. Re-calculating the score can be accomplished in a manner similar to the operations performed in blocks 408 and 410, using the second list of seen n-grams. At block 432, the position of the selected snippet in the sorted set of snippets can be re-determined. At block 434, if the position of the selected snippet was re-determined as still being the top-scoring snippet, process 400 continues back to block 420, otherwise process 400 continues back to block 426.

Once the loop between blocks 420 and 434 completes by determining, at block 426, that no additional snippets are in the set of snippets, process 400 continues to block 436 where a number, percentage, or other threshold level of top scoring snippets, i.e. those that were added to the training data earlier than the non-selected snippets at block 420, are selected as the final training data set and are returned.

The snippets in the returned training data can be further converted for engine specific use, such as by performing POS tagging, translations, or corrections of the snippets in the training data. In various implementations, this conversion can be done manually or automatically. The converted training data can be used to create engines, such as a POS tagging engine, a machine translation engine, or a correction engine. In some implementations, training data can be used to create a classifier portion of an engine, such as a neural network or support vector machine. In some implementations, rules can be extracted from training data, such as phrase correction or translation pairs. Process 400 then continues to block 438, where it ends.

Figure 5:
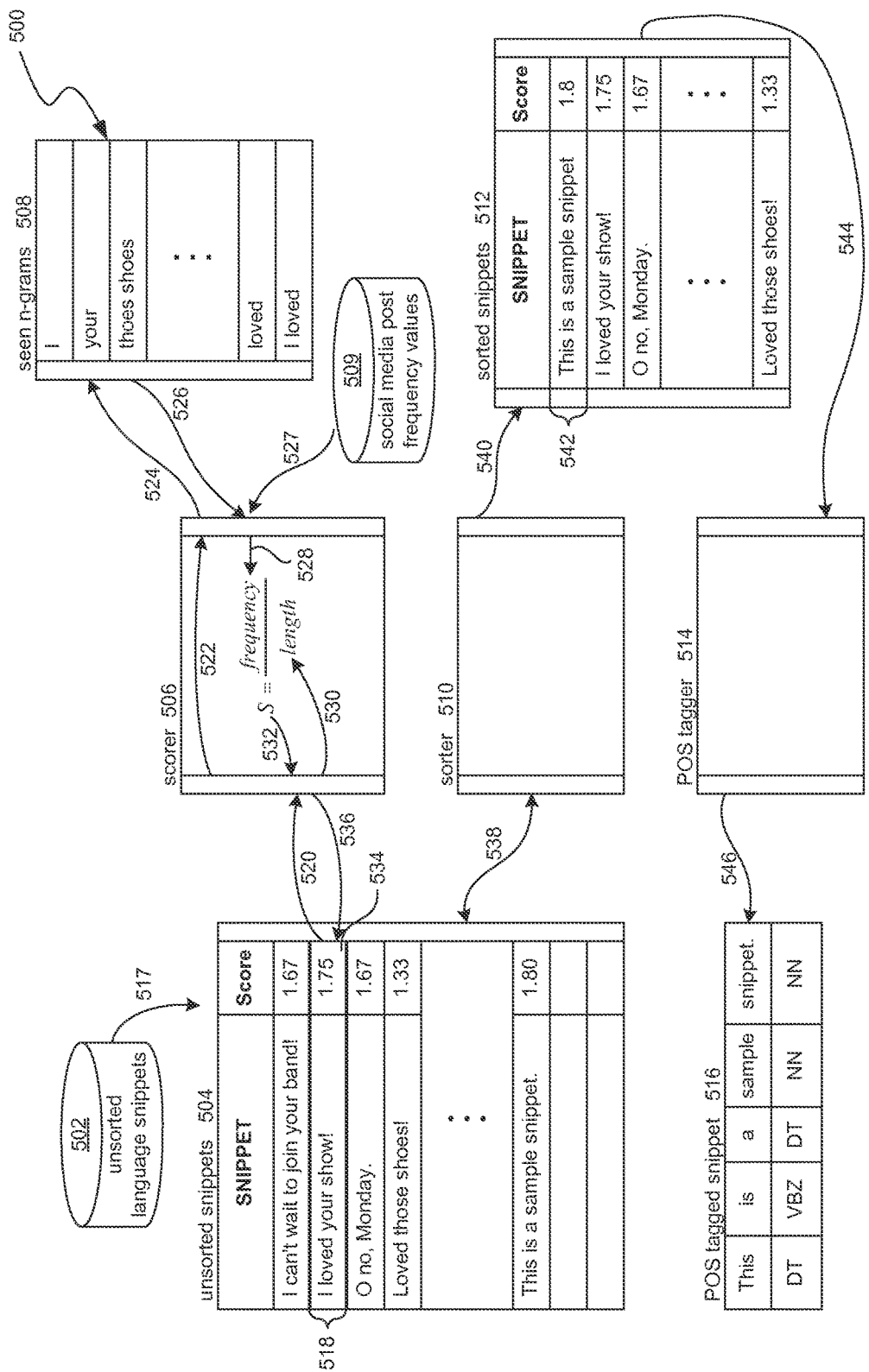
FIG. 5 is an example illustrating obtaining high-coverage training data for a POS tagging engine.

FIG. 5 is an example 500 illustrating obtaining high-coverage training data for a POS tagging engine. The components involved in example 500 include a data store 502 storing unsorted language snippets 504, a scorer 506, a data structure storing seen n-grams 508, a data store 509 storing n-gram frequency values from posts to a social media website, a sorter 510, a data structure storing sorted snippets 512, a POS tagger 514, and a POS tagged snippet 516.

Example 500 begins with the retrieval of a set of unsorted snippets 504 from data store 502 at action 517. Scores are then assigned to each of the unsorted snippets 504. The scoring process is demonstrated for snippet 518. The scoring process begins by sending snippet 518 to scorer 506 at action 520. Scorer 506 can then interface with seen n-grams list 508 to determine which n-grams in snippet 518 are unseen n-grams at action 524. In this example, the maximum n-gram length is set to two, so the n-grams in snippet 518 are: "I," "loved," "your," "show," "I loved," "loved your," and "your show." Of these, "I" and "your" are n-grams that were in a previous snippet, thus the unseen n-grams in snippet 518 are "loved," "show," "I loved," "loved your," and "your show," which are added to the seen n-grams 508 and indicated to scorer 506 at action 526. Scorer 506 then obtains a sum of frequency values for these unseen n-grams at action 528. In example 500, the frequency values are obtained at action 527 from data store 509, which has n-gram frequency values obtained from social media posts. In example 500, the frequency values for the unseen n-grams are as follows: "loved":3.1, "show":1.9, "I loved":0.8, "loved your":0.75, and "your show":0.45. Scorer 506 sets the sum of these values, 7, as the numerator of the score at action 528. Scorer 506 sets the length, 4, of snippet 518 as the denominator of the score at action 530. Scorer 506 then computes and returns the score for snippet 518, 1.75, at action 532. This score 534 is associated with snippet 518 at action 536.

Once all the unsorted snippets 504 are associated with a score, the unsorted snippets 504 are provided to sorter 510 at action 538. Sorter 510 sorts snippets 504 according to the associated scores. In some implementations, the sorting can re-iterate through sorted snippets one or more times, updating snippet scores as other snippets are identified as top scoring snippets. This process can include: 1) scoring all snippets initially; 2) sorting the scored snippets; 3) selecting the top scoring snippet and adding that top scoring snippet and all the n-grams in that top scoring snippet to training data; 4) selecting the next top scoring snippet and recalculating the score for that next top scoring snippet; 5) re-sorting selected the next top scoring snippet into the sorted snippets; 6) if top snippet remains the top scoring snippet and adding that top scoring snippet and all the n-grams in that selected snippet to training data; and 7) Repeat from 4 until all the snippets have been removed from the sorted set.

Sorter 510 provides sorted snippets 512 at action 540. In example 500, 50 k snippets are being chosen as training data for generating a POS tagging engine. The top 50 k snippets of sorted snippets 512 are selected to be POS tagged for use as training data. Snippet 542 is in the top 50 k snippets, thus at action 544, snippet 542 is passed to POS tagger 514. POS tagger 514 gets human input to perform POS tagging of received snippets, such as snippet 542. At action 546, POS tagger provides POS tagged snippet 516, created from snippet 542. POS tagged snippet 516 can now be used as training data for a POS tagging engine.

Several implementations of the disclosed technology are described above in reference to the figures. The computing devices on which the described technology may be implemented may include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links may be used, such as the Internet, a local area network, a wide area network, or a point-to-point dial-up connection. Thus, computer-readable media can comprise computer-readable storage media (e.g., "non-transitory" media) and computer-readable transmission media.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C, etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

I claim:

1. A method for obtaining engine training data that has high coverage comprising:
   receiving a set of potential training data snippets comprising one or more n-grams;
   for each selected snippet of two or more of the potential training data snippets, computing a snippet score for the selected snippet by:
      identifying one or more n-grams of the selected snippet as unseen n-grams;
      obtaining a frequency value for the identified unseen n-grams;
      computing a sum of the obtained frequency values;
      computing a length value of the selected snippet; and
      computing the snippet score for the selected snippet by dividing the sum of the obtained frequency values by the length value of the selected snippet;
   sorting the set of potential training data snippets, as sorted snippets, based on the computed snippet scores;
   selecting, based on snippet locations in the sorted snippets, one or more of the potential training data snippets as the engine training data; and
   storing the engine training data in a memory, wherein the engine training data is used by an engine to perform automated language processing functions.

2. The method of claim 1, wherein at least some of the potential training data snippets originated as posts to a social media website.

3. The method of claim 1, wherein identifying the one or more n-grams of the selected snippet as unseen n-grams comprises:
   comparing n-grams of the selected snippet to a data structure identifying seen n-grams;
   identifying the unseen n-grams based on the unseen n-grams not being identified in the data structure identifying seen n-grams; and
   adding, to the data structure identifying seen n-grams, the identified unseen n-grams.

4. The method of claim 1, wherein the frequency value for each selected unseen n-gram of the identified unseen n-grams is based on a count of the selected unseen n-gram in a specified language corpus.

5. The method of claim 4, wherein the specified language corpus is a set of social media posts.

6. The method of claim 1, wherein selecting one or more of the potential training data snippets as the engine training data comprises:
   creating a new list of seen n-grams;
   identifying the highest scoring snippet in the sorted set of potential training data snippets;
   adding the identified snippet to the engine training data;
   adding, to the new list of seen n-grams, one or more n-grams from the identified snippet;
   removing the identified snippet from the sorted set of potential training data snippets; and
   iteratively, until a number of snippets in the engine training data is at a threshold:
      recognizing a next top scoring snippet;
      recalculating the snippet score for that recognized next top scoring snippet based on the new list of seen n-grams;
      re-sorting that recognized next top scoring snippet into the sorted set of potential training data snippets; and
      if that recognized next top scoring snippet remains the top scoring snippet:
         adding that recognized next top scoring snippet to the engine training data;
         removing that recognized next top scoring snippet from the sorted set of potential training data snippets; and
         adding, to the new list of seen n-grams, one or more n-grams from that recognized next top scoring snippet.

7. The method of claim 1 further comprising using the engine training data to train a classifier component of an engine to perform automated language processing functions.

8. The method of claim 7, wherein the trained engine is a POS tagging engine that performs automated POS tagging language processing functions.

9. The method of claim 7, wherein the trained engine is a machine translation engine that performs automated language translation processing functions.

10. The method of claim 7, wherein the trained engine is a language correction engine that performs automated spelling correction processing functions.

11. The method of claim 1, wherein identifying the one or more n-grams of the selected snippet as unseen n-grams comprises determining whether any n-gram of the selected snippet with a length of no more than two words is an unseen n-gram.

12. A system for generating a language processing engine using high-coverage training data, the system comprising:
   an interface configured to receive a set of potential training data snippets, each potential training data snippet comprising one or more n-grams;
   an n-gram scorer configured to, for each selected snippet of two or more of the potential training data snippets, compute a snippet score for the selected snippet by:
      identifying one or more n-grams of the selected snippet as unseen n-grams;
      obtaining a frequency value the identified unseen n-grams;
      computing a length value of the selected snippet; and
      computing the snippet score for the selected snippet based on a comparison of the obtained frequency values and the length value of the selected snippet; and
   an n-gram sorter configured to sort the set of potential training data snippets, as sorted snippets, based on the computed snippet scores, and wherein the n-gram sorter configured to store the potential training data snippets in a memory;
   wherein the language processing engine is created using multiple of the potential training data snippets based on their order in sorted set of potential training data snippets to perform automated language processing functions.

13. The system of claim 12, wherein the n-gram scorer identifies the one or more n-grams of the selected snippet as unseen n-grams by:
   comparing n-grams of the selected snippet to a data structure identifying seen n-grams;
   identifying the unseen n-grams based on the unseen n-grams not being identified in the data structure identifying seen n-grams; and
   adding, to the data structure identifying seen n-grams, the identified unseen n-grams.

14. The system of claim 12, wherein the frequency value for each selected unseen n-gram of the identified unseen n-grams is based on a count of the selected unseen n-gram in a set of social media posts.

15. The system of claim 12, wherein the length value of the selected snippet is based on a count of words in the selected snippet.

16. The system of claim 12, wherein the language processing engine is one of:
   a POS tagging engine;
   a machine translation engine; or
   a spelling or grammar correction engine.

17. The system of claim 12, wherein the n-gram scorer identifies the one or more n-grams of the selected snippet as unseen n-grams by determining whether any n-gram with a length of no more than two words from the selected snippet is an unseen n-gram.

18. A non-transitory computer-readable storage medium storing instructions that, when executed by a computing system, cause the computing system to perform operations for obtaining engine training data that has high coverage, the operations comprising:
   receiving a set of potential training data snippets comprising one or more n-grams;
   for each selected snippet of two or more of the potential training data snippets, computing a snippet score for the selected snippet by:
      identifying one or more n-grams of the selected snippet as unseen n-grams;
      obtaining a frequency value for the identified unseen n-grams;
      computing a length value of the selected snippet; and
      computing the snippet score for the selected snippet based on a comparison of the obtained frequency values and the length value of the selected snippet; and
   selecting multiple of the potential training data snippets as the engine training data based on a comparison of the snippet scores assigned to the potential training data snippets; and
   storing the engine training data in a memory, wherein the engine training data is used by an engine to perform automated language processing functions.

19. The computer-readable storage medium of claim 18, wherein at least some of the potential training data snippets originated as posts to a social media website.

20. The computer-readable storage medium of claim 18, wherein identifying the one or more n-grams of the selected snippet as unseen n-grams comprises:
   comparing n-grams of the selected snippet to a data structure identifying seen n-grams;
   identifying the unseen n-grams based on the unseen n-grams not being identified in the data structure identifying seen n-grams; and
   adding, to the data structure identifying seen n-grams, the identified unseen n-grams.

\* \* \* \* \*